(No Model.) 2 Sheets—Sheet 1.
JOSEPH SCHILL, JOHN SCHILL & PETER SCHILL.
MAGAZINE HOT AIR FURNACE.
No. 466,944. Patented Jan. 12, 1892.
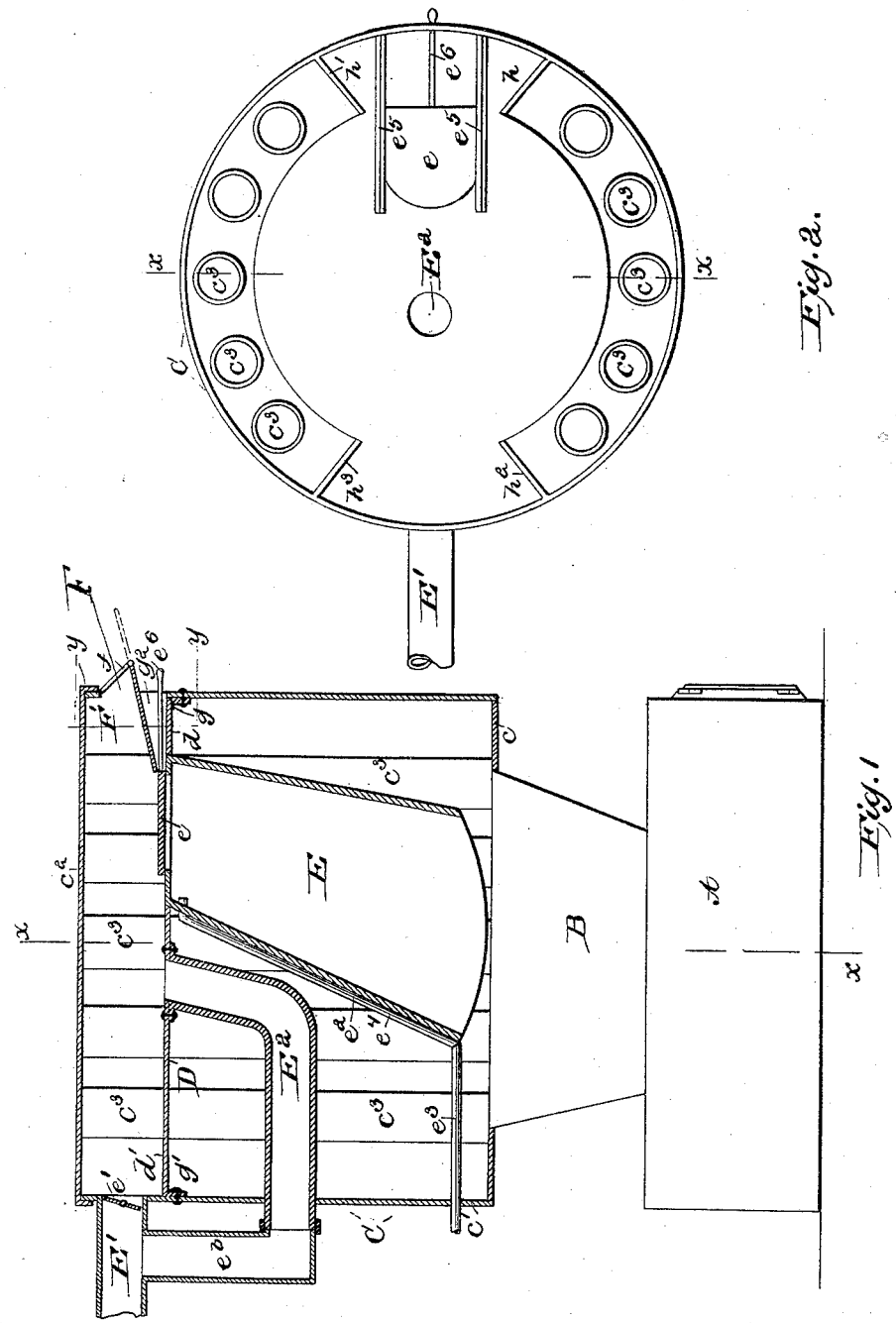
Witnesses:
Arthur Ashley
Horace A. Dodge.
Inventors:
Jos. Schill, Jno. Schill, Peter Schill,
per

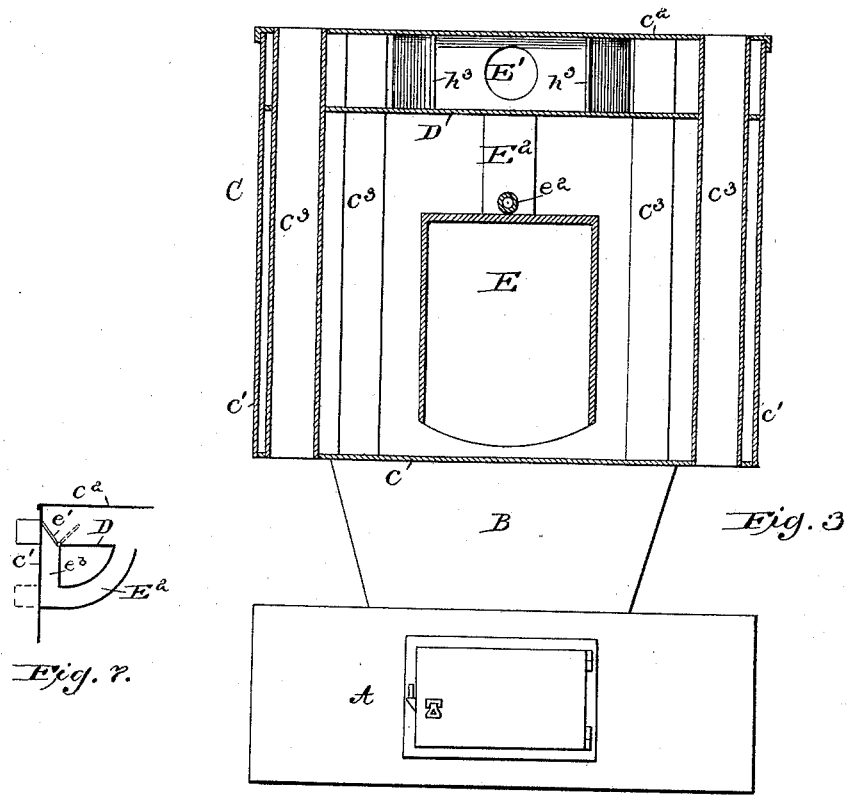
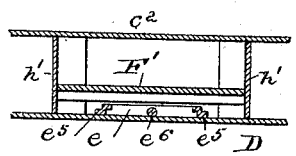
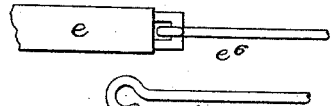
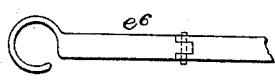
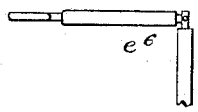

UNITED STATES PATENT OFFICE.

JOSEPH SCHILL, JOHN SCHILL, AND PETER SCHILL, OF CRESTLINE, OHIO.

MAGAZINE HOT-AIR FURNACE.

SPECIFICATION forming part of Letters Patent No. 466,944, dated January 12, 1892.

Application filed March 27, 1891. Serial No. 386,695. (No model.)

*To all whom it may concern:*

Be it known that we, JOSEPH SCHILL, JOHN SCHILL, and PETER SCHILL, of the city of Crestline, in the county of Crawford, in the State of Ohio, have invented a new and useful Magazine Hot-Air Furnace, of which the following is a description.

An important object of the invention is the production of a furnace of inexpensive construction which shall be adapted to produce and maintain a high degree of heat with a comparatively small consumption of fuel.

The invention consists in various novel parts and in various novel combinations of parts in a hot-air furnace, as will be described in detail, and then specifically summarized in the concluding paragraphs of this specification.

In the accompanying drawings, which constitute a part of this description, Figure 1 represents a central vertical longitudinal section of a furnace in which the invention is embodied, the furnace being shown as detached from its casing. Fig. 2 is a top plan view of the furnace seen in Fig. 1, the top plate having been removed. Fig. 3 represents a vertical transverse section in the line $x\ x$ in Figs. 1 and 2. Fig. 4 represents a detail transverse section in the line $y\ y$ in Fig. 1. Figs. 5 and 6 represent details of the closing-plate and its rod. Fig. 7 represents in vertical longitudinal central section a modification of the indirect exit-passage represented in Fig. 1.

The base or ash-pit section A and the fire-pot or fuel-chamber section B are or may be of any ordinary or approved construction.

The combustion-chamber section C is preferably of the cylindrical form represented in the several figures, its annular base-plate $c$ extending outwardly from the upper extremity of the fire-pot, as shown. From the outer periphery of the base-plate rises the cylindrical shell $c'$ of the combustion-chamber, and this in turn receives at its top the circular covering-plate $c^2$. At the right and at the left of the fire-pot the plate $c$ has a series of openings which correspond with similar openings in the top plate and which are connected with the same by open air-warming pipes $c^3$. At a suitable distance below the upper extremity of the combustion-chamber is a horizontal "magazine-head" or diaphragm D, which in its central portion is circular in form and which at each end—that is, at the front and at the rear of the furnace—has outwardly-enlarging or segmental peripheral portions $d$ and $d'$.

From an opening in the front portion of the diaphragm or magazine-head depends the magazine E, which extends downwardly to a point a short distance above the plane of the fire-pot. Behind the magazine-opening and near the center of the diaphragm is a smaller opening, from which, first downwardly and then rearwardly, is extended a pipe or smoke-conduit $E^2$. Above the diaphragm in the rear wall of the cylinder is an opening, from which extends a horizontal smoke-flue or exit-pipe E', which is provided with a damper $e'$. At a point outside the body or shell of the furnace the indirect exit-pipe $E^2$ is connected by a pipe $eb$ with the direct exit-pipe E', the connection therewith being made, of course, at a point exterior to the controlling-damper $e'$. At the front and opposite the opening of the exit-pipe E' is a feed-opening F, provided with a door $f$, which when unclosed forms an inclined continuation of a feed-chute F', which overlies the extension $d$ and extends from the fuel-opening to the upper extremity of the magazine. The magazine is provided with a suitable cover or closing-plate $e$ and with an air-supply pipe $e^2$, which has a horizontal section $e^3$ and a vertical section $e^4$, which extends from the horizontal section upwardly along the body of the magazine to a point at or near the upper extremity thereof, where it discharges into or is extended through an opening which is formed in the body of the magazine.

It will be noted that the closing-plate or lid $e$ of the magazine-opening has parallel straight edges which are overhung by guideways $e^5\ e^5$, along which the plate is moved in closing or in unclosing the mouth of the magazine, being actuated by an operating rod or handle $e^6$, which may be either detachably or non-detachably connected to the plate, as represented, respectively, in Figs. 6 and 7.

It will be seen that the inclined way or feed-chute F' at its inner extremity terminates at a point in a higher plane than the surface of the diaphragm or magazine-head, and that a chamber $g^2$ is thereby formed between the bottom of the chute and the top of the extension $d$, within which the closing-plate is received whenever it is withdrawn from its normal position upon the fuel-opening. It will also be noted that the operating rod or handle of the slidable closing-plate is jointed at about its mid-length, so that when the plate is drawn to its outer adjustment the outer portion of the rod will instantly fall to a pendent position, and thereby permit convenient access to the fuel-supplying chute.

The diaphragm or magazine-head D may rest upon lugs $g$, formed with or attached to the inner face of the cylinder $c'$, or it may be provided with a continuous flange, as $g'$, and be secured to the body of the cylinder by any suitable number of rivets, and it will be understood that the connection of the magazine and of the diving-flue $E^2$ with the diaphragm D may be similarly varied, any suitable means of attachment being provided.

It should be understood that the space between the plane of the diaphragm and the covering-plate of the furnace contiguous to the sections $d$ and $d'$ is closed by a vertical plate, as $h$, $h'$, $h^2$, and $h^3$, but that the inner space between these two plates is entirely open. It follows, therefore, that in the operation of the furnace the volatile products of combustion rising from the mass of burning fuel will first envelop the magazine, the indirect exit-flue, and the lower portion of the air-warming flues $c^3$, and will then pass outwardly and upwardly between and around the upper extremity of the air-warming pipes and then inwardly over the edges of the diaphragm and toward the central portion of the same. If then the direct-exit opening be unclosed, the products will escape at that point; but if the damper $e'$ be closed the exit will be downward and rearward through the central flue.

By reason of the provision of the air-induction pipe, introduced at a low-down point and extending to the upper extremity of the combustion-chamber and the magazine, air is freely supplied and, mingling with the gases within the magazine, forces them downward into contact with or within the influence of the incandescent contents of the fire-pot, and thus insures their combustion.

The near proximity of the air-pipes to the fuel-chamber and their extension through the combustion-chamber insures a quick passage and a thorough heating of the air.

It will be noted that the location of the magazine and the indirect exit-pipe in the central portion of the combustion-chamber has the effect to spread out the escaping smoke-currents and direct them into those portions of such chamber through which the air-warming pipes are extended.

No radiator being provided above the body or combustion-chamber of the furnace, a high air-casing is not necessary, and consequently it is easily practicable to give sufficient inclination to the hot-air pipes to insure a rapid movement of the currents therethrough.

The invention having been thus described, what is claimed is—

1. In a hot-air furnace having a cylindrical combustion-chamber, a diaphragm in the upper portion of the combustion-chamber, a fuel-magazine suspended from the diaphragm, and a series of air-pipes exterior to the diaphragm and extending through the combustion-chamber from bottom to top thereof, in combination.

2. In a hot-air furnace, a series of vertical air-warming tubes which extend through the outer portion of the combustion-chamber at the right and at the left thereof, and a horizontal diaphragm, from which depend a fuel-magazine and a smoke-exit flue, and above which the products of combustion ascend at each side, whether for direct or indirect exit, in combination, substantially as specified.

3. In a hot-air furnace, a horizontal diaphragm, from the front portion of which depends a fuel-magazine, and from the central portion of which depends an indirect exit-flue, which extends first downwardly, then rearwardly through the mid-height portion of the combustion-chamber, and then upwardly to the direct exit-pipe above the plane of the diaphragm, substantially as set forth.

4. In a hot-air furnace, a fuel-magazine which is provided with an air-induction pipe, the lower section of which extends horizontally through the lower extremity of the combustion-chamber and in plane with the lower extremity of the magazine, the inclined portion of which rests against the inclined rear wall of the magazine, and the upper portion of which discharges into the upper extremity of such fuel-magazine, combined with the combustion-chamber, substantially as shown and described.

5. In a hot-air furnace, a horizontal diaphragm in the upper portion of the furnace, provided with a fuel-receiving opening and a slidable closing-plate, a fuel-magazine depending from the horizontal diaphragm, an outer fuel-supply opening at the upper extremity of the front wall of the furnace, and an inclined feed-chute which extends from the outer fuel-supply opening in the vertical wall of the furnace to the fuel-receiving opening in the horizontal diaphragm, but which at its lowest extremity terminates in a plane which is above the surface of the diaphragm, in combination, substantially as and for the purposes set forth.

6. In a hot-air furnace, the magazine-supporting diaphragm D, having the extension $d$, closed at its sides, as described, in combination with the inclined extensible feed-chute F', extending inwardly from the outer feed-opening and forming in connection with the extension $a$ a chamber for the reception of the outdrawn closing-plate of the magazine, substantially as described.

7. In a hot-air furnace, a horizontal diaphragm in the upper portion of the furnace, a fuel-magazine depending from the diaphragm, guideways upon the diaphragm coincident with the receiving-opening of the magazine, a feed-chute inclined to the fuel-receiving opening of the magazine and extensible at its outer extremity, a chamber between the feed-chute and the diaphragm, and a closing-plate or lid which is adapted to the fuel-receiving opening to the guideways and to the intermediate chamber, in combination, substantially as specified.

JOS. SCHILL.
JOHN SCHILL.
PETER SCHILL.

Witnesses:
GEO. A. MUSSELMAN,
H. BERKERSHER.